(12) United States Patent
Muraoka et al.

(10) Patent No.: US 8,225,652 B2
(45) Date of Patent: Jul. 24, 2012

(54) THERMAL FLOW METER MEASURING FLOW RATE BASED ON TEMPERATURE DIFFERENCE MEASUREMENT AND DRIVING ENERGY OF THE HEATER

(75) Inventors: Manabu Muraoka, Tokyo (JP); Masaki Seo, Tokyo (JP); Junichi Matsuda, Tokyo (JP); Masanori Anzai, Tokyo (JP)

(73) Assignee: Azbil Corporation, Tokyo (JP)

( * ) Notice: Subject to any disclaimer, the term of this patent is extended or adjusted under 35 U.S.C. 154(b) by 323 days.

(21) Appl. No.: 12/599,950

(22) PCT Filed: Apr. 22, 2008

(86) PCT No.: PCT/JP2008/057767
§ 371 (c)(1),
(2), (4) Date: Nov. 12, 2009

(87) PCT Pub. No.: WO2008/142941
PCT Pub. Date: Nov. 27, 2008

(65) Prior Publication Data
US 2010/0223991 A1    Sep. 9, 2010

(30) Foreign Application Priority Data
May 24, 2007   (JP) .................................. 2007-137906

(51) Int. Cl.
*G01F 1/68* (2006.01)
(52) U.S. Cl. .................................. 73/204.15; 73/204.26
(58) Field of Classification Search ........................ None
See application file for complete search history.

(56) References Cited

U.S. PATENT DOCUMENTS

| | | | |
|---|---|---|---|
| 4,706,061 A | 11/1987 | Johnson | |
| 4,777,820 A | 10/1988 | Hecht et al. | |
| 6,470,742 B1 | 10/2002 | Yamakawa et al. | |
| 6,763,710 B2* | 7/2004 | Mayer et al. | 73/204.11 |
| 6,839,643 B2* | 1/2005 | Kanke et al. | 702/45 |
| 7,028,533 B2* | 4/2006 | Koike et al. | 73/49.5 |
| 7,457,711 B2* | 11/2008 | Kanke et al. | 702/45 |
| 2005/0155421 A1 | 7/2005 | Koike et al. | |

FOREIGN PATENT DOCUMENTS

| | | |
|---|---|---|
| EP | 452134 A2 | 10/1991 |
| EP | 1491866 A1 | 12/2004 |
| JP | 2-259527 A | 10/1990 |
| JP | 4-230808 A | 8/1992 |
| JP | 2003-279437 A | 10/2003 |

* cited by examiner

*Primary Examiner* — Harshad Patel
(74) *Attorney, Agent, or Firm* — McDermott Will & Emery LLP (57) ABSTRACT

A thermal flow meter has a sensor chip, a heater, first and second flow rate calculators, and an output controller. The heater increases the ambient temperature in the vicinity of a pair of temperature-sensing elements on the sensor chip by a particular temperature above a temperature of a fluid flowing along the sensor chip. The first flow rate calculator calculates a flow rate of the fluid from a temperature difference detected by the pair of temperature-sensing elements. The second flow rate calculator calculates a flow rate of the fluid from a driving energy of the heater. The output controller outputs the flow rate calculated by the second flow rate calculator, instead of the flow rate calculated by the first flow rate calculator, when the flow rate calculated by the first flow rate calculator exceeds a flow rate threshold value that is set in advance.

4 Claims, 5 Drawing Sheets

Flow Rate %

THERMAL FLOW METER MEASURING FLOW RATE BASED ON TEMPERATURE DIFFERENCE MEASUREMENT AND DRIVING ENERGY OF THE HEATER

CROSS REFERENCE TO RELATED APPLICATION

This is the U.S. national phase application under 35 U.S.C. §371 of International Patent Application No. PCT/JP2008/057767, filed Apr. 22, 2008 which claims the benefit of Japanese Application No. 2007-137906, filed May 24, 2007. The International Application was published on Nov. 27, 2008 as International Publication No. WO/2008/142941 under PCT Article 21(2). The contents of these applications are incorporated herein in their entirety.

FIELD OF TECHNOLOGY

The present invention relates to a thermal flow meter of a simple structure capable of measuring with high accuracy a fluid flow rate in a regular flow rate range and capable also of detecting reliably the flow rate even when a large volume of fluid flows outside of the regular flow rate range.

BACKGROUND OF THE INVENTION

Figure 8:
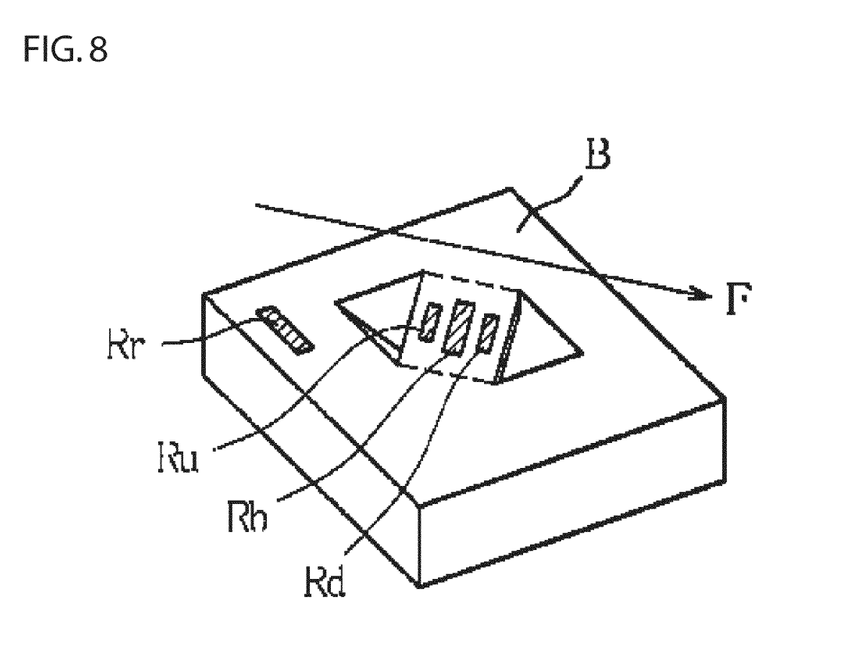
FIG. 8 is a diagram illustrating schematically the structure of a thermal flow rate sensor.
Figure 9:
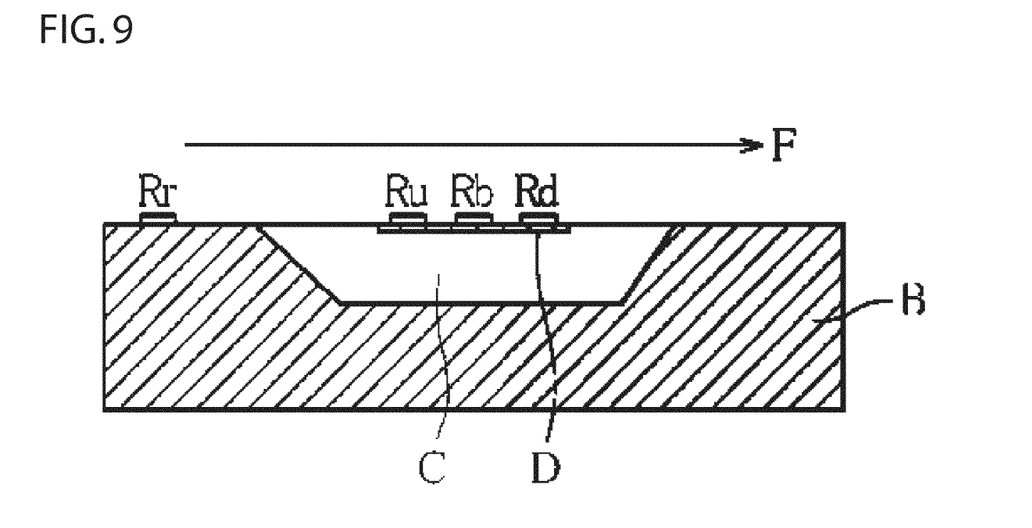
FIG. 9 is a diagram illustrating the cross-sectional structure of the thermal flow rate sensor illustrated in FIG. 8.

Sensor chips wherein a pair of temperature-sensitive elements Ru and Rd are formed with a heater element Rh therebetween, on a semiconductor substrate (for example, a silicon substrate) B, as illustrated, for example, in FIG. 8, have been the center of focus as a flow rate sensor capable of detecting with high precision fluid mass flows of a variety of fluids. Note that the pair of temperature-sensitive elements Ru and Rd and the heater element Rh are each formed from thin-film resistors of, for example, platinum (Pt). The heater element Rh and the pair of temperature-sensitive elements Ru and Rd are provided lined up along the direction of flow F of the fluid on a thin diaphragm D that is provided spanning a cavity (the recessed portion) C that is formed on the semiconductor substrate B, as illustrated in FIG. 9, which illustrates the cross-sectional structure thereof schematically. Note that in the figure, Rr is a temperature-detecting element for detecting the air temperature (fluid temperature) in the ambient environment of the sensor chip, provided at a location that is separate from the diaphragm D on the semiconductor substrate B.

The thermal flow meter that uses this type of sensor chip, as illustrated in, for example, Japanese Unexamined Patent Application Publication 2003-247876, focuses on the difference in the temperatures detected by the pair of temperature-sensitive elements Ru and Rd, produced by converting, into a flow rate (flow speed) Q of the fluid, the temperature distribution in the vicinity of the diaphragm D that results when the ambient temperature in the vicinity of the temperature-sensitive elements Ru and Rd, and, in particular, the heating temperature of the heater element Rh, is increased to a particular temperature higher than the ambient temperature (the fluid temperature) that is detected by the temperature detecting element Rr. The structure is such that the mass flow rate Q of the fluid can be calculated from the difference in temperatures detected by the pair of temperature-measuring elements Ru and Rd.

Even though the thermal flow meter with a structure set forth above is small and has high accuracy, it has problems in securing a broad range for the flow rate measurement range (the dynamic range). Because of this, conventionally a broad flow rate measurement range (dynamic range) has been secured through, for example, using a thermal flow meter for low flow rate measurements in parallel with a thermal flow meter for high flow rate measurements. However, typically it is difficult to assemble together a plurality of sensor chips (flow rate sensors) having different flow rate measurement ranges in a narrow flow path for the flow rate measurement, branched from a main flow path made from the fluid flow tube. Furthermore, when a plurality of flow sensor chips having different measurement flow rate ranges is assembled together in this type of narrow flow path, there is the risk of causing an interference with the measurement of the low flow rate.

SUMMARY OF THE INVENTION

The present invention is the result of contemplation on this type of situation, and the object thereof is to provide a thermal flow meter with a simple structure able to measure with high accuracy the fluid flow rate in the required study flow rate range and able to detect accurately the flow rate even when there is a large flow of the fluid, outside of the regular flow rate range.

The present invention focuses on the change in the driving power for a heating element corresponding to the thermal energy required to maintain the temperature in the vicinity of a pair of temperature-sensitive elements at a specific temperature higher than the ambient temperature, depending on the flow rate of the fluid, and focuses on the change in the thermal energy (the driving power for the heater element), depending on the flow rate of the fluid, even when the flow rate that can be calculated with high accuracy based on the difference in temperatures detected by the pair of temperature-sensitive elements is saturated, outside of the flow rate measurement range (the dynamic range) when the flow rate is large.

Given this, the thermal flow meter as set forth in the present invention, in order to achieve the object set forth above, comprises heating means for increasing the temperature in the vicinity of a temperature-sensitive element on a sensor chip that is provided with a pair of temperature-sensitive elements to a particular temperature above the temperature of a fluid that flows along the sensor chip, first flow rate calculating means for calculating the flow rate of the fluid from a temperature difference that is detected by the pair of temperature-sensitive elements, second flow rate calculating means for calculating the flow rate of the fluid from the driving energy of the heating means, and output controlling means for outputting the flow rate calculated by the second flow rate calculating means instead of the flow rate calculated by the first flow rate calculating means when the flow rate calculated by the first flow rate calculating means exceeds a flow rate threshold value.

Given the thermal flow meter structured as set forth above, the first flow rate calculating means calculates the flow rate of the fluid based on the temperature difference calculated by the pair of temperature-sensitive elements, so the fluid flow rate is detected with adequately high accuracy in a specific measurement flow rate range that is set in advance. In contrast, the second flow rate calculating means detects only the fluid flow rate based on the driving current of a heater element, for example, and thus the measurement accuracy is not as high in the aforementioned measurement flow rate range as it is for the first flow rate calculating means.

However, when the fluid flow rate is large and the flow rate measured by the first flow rate measuring means exceeds the limits of the flow rate measuring range, and specifically, when the flow rate measured by the first flow rate measuring means is saturated, then the flow rate calculated by the second flow rate calculating means it is outputted instead of the flow rate calculated by the first flow rate calculating means. Consequently, even in a situation wherein the flow rate calculated by the first flow rate calculating means is saturated so that the flow rate cannot be detected, the flow rate calculated by the second flow rate calculating means is outputted instead, making it possible to increase, essentially, the measurement flow rate range (the dynamic range). Consequently, it becomes possible, in a thermal flow meter that uses a sensor chip that is provided with a pair of temperature-sensitive elements, to achieve effectively flow rate measurements across a broad range that exceeds the regular measurement flow rate range while still performing with high accuracy the flow rate measurements within the regular measurement flow rate range that is measured using the pair of temperature-sensitive elements. That is, it is possible to achieve a thermal flow meter, with a small and simple structure, capable of performing flow rate measurements across a broad range, without using a thermal flow meter for low flow rate measurements in parallel with a thermal flow meter for high flow rate measurements.

The heating means preferably drive the heating of a heater element that is lined up with the pair of temperature-sensitive elements and is formed between the temperature-sensitive elements, and the second flow rate calculating means are structured so as to be able to calculate the flow range of the fluid from the driving electric power of the heater element.

Given this structure, the heating means are structured from a heater element that is lined up with the pair of temperature-sensitive elements and is formed between the temperature-sensitive elements, and thus it is possible to assemble the heating means into the chip, and possible to calculate the flow rate without any interference whatsoever by the second flow rate calculating means based on the driving power of the heater element, and thus this structure is useful in achieving a thermal flow meter with a small and simple structure.

Additionally, instead the heating means may perform driving of the heating of the pair of temperature-sensitive elements, and the second flow rate calculating means may be structured so as to calculate the flow rate of the fluid from the heating driving power for the pair of temperature-sensitive elements.

Given this structure, the heating means drive the heating of the pair of temperature-sensitive elements, and the second flow rate calculating means can calculate the flow rate based on the driving power for the temperature-sensitive elements without any interferences whatsoever, making it possible to achieve a thermal flow meter with a small and simple structure.

Furthermore, the output controlling means are structured so as to be provided with a function for outputting, as a reverse-flow flow rate of the fluid, a flow rate calculated by the second flow rate calculating means, instead of the flow rate calculated by the first flow rate calculating means, as necessary when the flow rate calculated by the first flow rate calculating means indicates a negative value.

Given this structure, when there is a reverse flow of the fluid, then the flow rate calculated by the second flow rate calculating means is outputted as the reverse-flow flow rate of the fluid, and thus there is no need to provide means such as a circuit for switching the output of the first calculating means and the output of the second calculating means when there is a reverse flow. This is useful in a situation wherein there is little effect in performing the switching when detecting the flow rate at the time of a reverse flow, such as when the measured flow rate range in the first flow rate calculating means is structurally quite small. The use of this structure makes it possible to simplify the structure and to reduce costs.

DETAILED DESCRIPTION OF THE INVENTION

The drawings will be referenced below to describe a thermal flow meter according to the present invention. Note that the thermal flow meter according to the present invention is of a type wherein the flow rate Q of the fluid is calculated from a temperature difference $\Delta T$ that is detected by a pair of temperature-sensitive elements Ru and Rd when the ambient temperature in the vicinity of the pair of temperature-sensitive elements Ru and Rd, which are provided on a sensor chip, is increased a constant temperature T above the temperature of the fluid that flows along the sensor chip.

Figure 1:
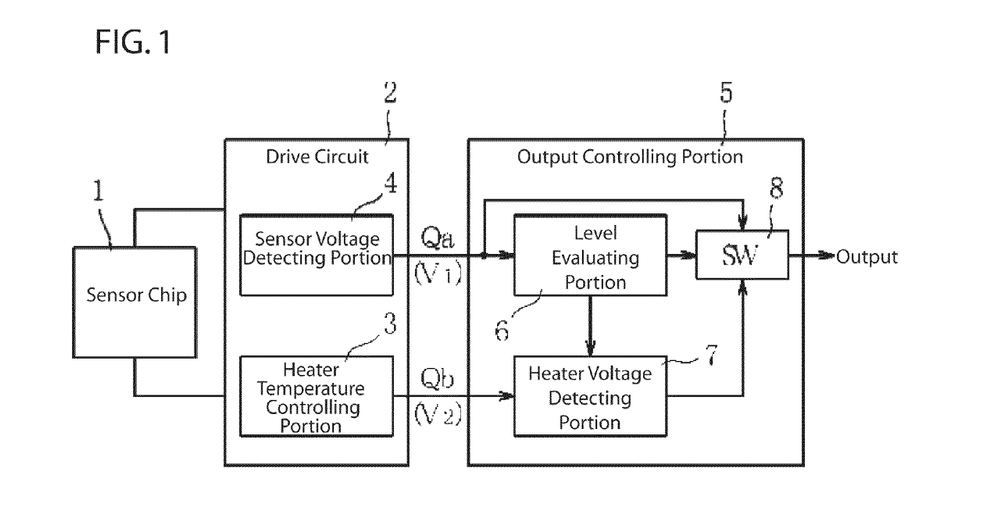
FIG. 1 is a block diagram illustrating schematically the structure of a thermal flow meter at as set forth in one example of embodiment according to the present invention.
Figure 7:
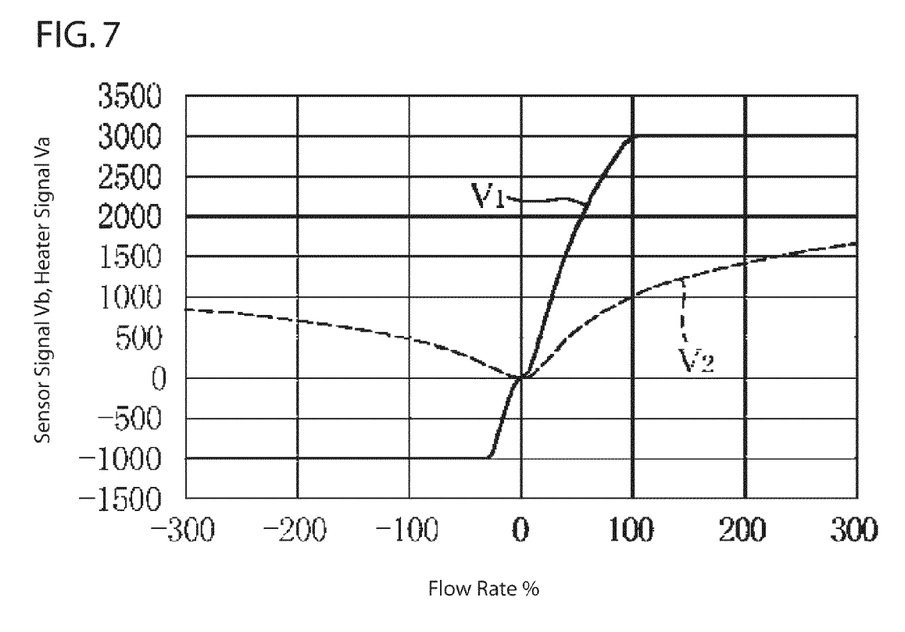
FIG. 7 is a diagram illustrating the detection characteristics for a reverse flow for the flow rate sensor.

FIG. 1 illustrates schematically the structure of a thermal flow meter as set forth in an example of embodiment according to the present invention, wherein 1 is a sensor chip with an element structure as illustrated, for example, in FIG. 7 and FIG. 8, wherein a pair of temperature-sensitive elements Ru and Rd, a heater element Rh, and a temperature-detecting element Rr are formed on a semiconductor substrate, such as silicon. The driving circuit 2 of the sensor chip 1 is provided with a heater temperature controlling portion 3 for driving the heater element Rh to generate heat in accordance with the ambient temperature T detected by the temperature detecting element Rr, to cause the temperature in the vicinity of the pair of temperature-sensitive elements Ru and Rd to be higher by a particular temperature $\Delta T$, and a sensor voltage detecting portion (first flow rate detecting means) 4 for calculating, as the flow rate Qa of the fluid that flows along the sensor chip 1, a temperature difference $\Delta T = Tu - Td$ by detecting the temperatures Tu and Td in that vicinity using the temperature-sensitive elements Ru and Rd.

The thermal flow meter according to the present invention is provided with an output controlling portion 5 for controlling the output of the sensor signal, in addition to the basic structure as above. The output controlling portion 5 is provided with a level evaluating portion 6 for comparing the flow rate Qa (the sensor signal V1), detected by, for example, the sensor voltage detecting portion 4, to a threshold value that is set in advance, a heater voltage detecting portion (second flow rate detecting means) 7 for calculating a flow rate as a flow rate Qb (a heater signal V2) for the fluid that flows along the sensor chip 1, from the driving energy of the heater element Rh for which the generation of heat is controlled by the heater temperature controlling portion 3, and a switching circuit 8 for outputting selectively the flow rates Qa and Qb in accordance with the results of evaluations by the level evaluating portion 6.

In particular, the level evaluating portion 6 has an upper limit value of the standard flow rate measurement range (the measurement specification) required in the thermal flow meter, for example, set as a threshold value Qmax, and is structured so that when the flow rate Qa detected by the sensor voltage detecting portion 4 is in excess of the threshold value Qmax, the switching circuit 8 is controlled so as to switch, to output, as the sensor signal, the flow rate Qb that is detected by the heater voltage detecting portion 7, instead of the flow rate Qa.

Figure 2:
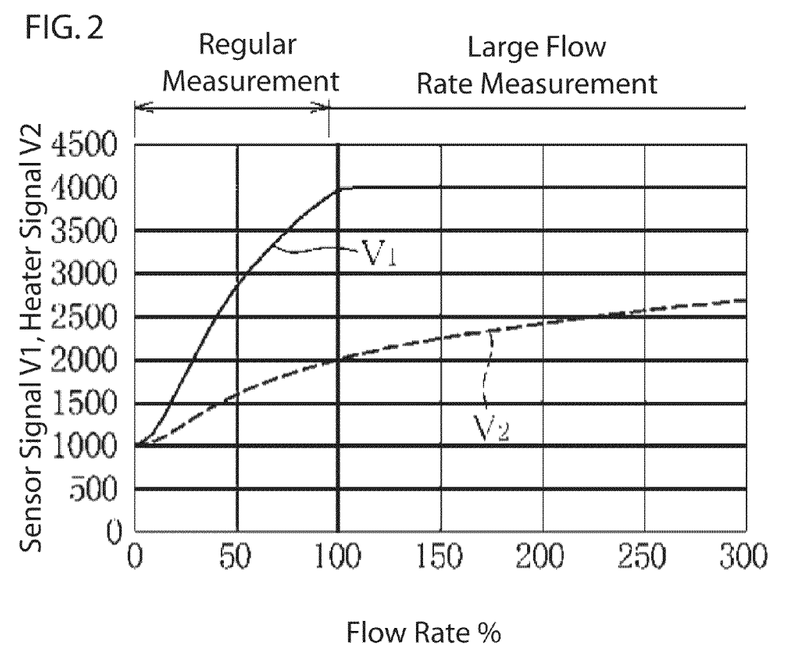
FIG. 2 is a diagram illustrating the state of change of the sensor signal V1 and the heater signal V2 of the thermal flow meter in response to a change in flow rate.

Specifically, the sensor chip 1 and the driving circuit 2 thereof are designed so as to be able to perform high-sensitivity and high-accuracy flow rate measurements in a standard flow rate measurement range in accordance with specifications that are required in the thermal flow meter. That is, the sensor chip 1 and the driving circuit 2 are designed so that the output voltage Va thereof in the measurement target range from the 0% flow rate status to a 100% flow rate, given by the specification for the flow rate measurement, will vary essentially linearly from the minimum output voltage Vmin to the maximum output voltage Vmax of the sensor voltage detecting portion 4, for example, as illustrated in FIG. 2. Because of this, if the flow rate Q of the fluid exceeds the upper limit value of the measurement range (the 100% flow rate), then the output voltage (the sensor signal) V1 of the sensor voltage detecting portion 4 will saturate at the maximum output voltage Vmax.

In contrast, the heater temperature controlling portion 3 simply drives the heater element Rh to generate heat to cause the temperature in the vicinity of the pair of temperature-sensitive elements Ru and Rd to be higher by a particular temperature $\Delta T$ than the ambient temperature T detected by the temperature sensor Rr, as described above. Because the amount of heat that is carried away by the fluid increases in accordance with an increase in the flow rate Q of the fluid, the rate at which the heater temperature controlling portion 3 drives the generation of heat of the heater element Rh increases to compensate for the drop in temperature due to the amount of heat carried away by the fluid. The result is that the driving energy of the heater element Rh by the heater temperature controlling portion 3 (the heater signal V2) increases steadily in accordance with the increase in the flow rate Q, as illustrated in FIG. 2. The change in the heater signal V2 in relation to the change in the flow rate Q is not particularly noticeable (that is, not highly sensitive) when compared to the change in the sensor signal V1 that is outputted from the sensor voltage detecting portion 4, described above, but can be said to roughly indicate the flow rate Q of the fluid. Furthermore, the heater signal V2 increases gradually until the 100% flow rate is exceeded, as illustrated in FIG. 2. Consequently, while focusing on this heater signal V2 has low measurement accuracy, doing so enables the calculation of the fluid flow rate Q, without being constrained to the flow rate measurement range (0 through 100% flow rate) required in the thermal flow meter.

Given this, in the thermal flow meter as set forth in the present invention, the flow rate Qa outputted by the sensor voltage detecting portion 4 (the sensor signal V1) is compared to a threshold value Qmax that has been set in advance (the upper limit value of the measurement range, which is the 100% flow rate) by the level evaluating portion 6, as described above. If the flow rate Q is in excess of the 100% flow rate, then the flow rate Qb (the heater signal V2) that is calculated from the heater signal is outputted instead of the flow rate Qa (the sensor signal V1), so that even if it is not possible to calculate the flow rate Q from the sensor signal V1, it is still possible to calculate the flow rate Q, albeit roughly. Consequently, the thermal flow meter according to the present invention has effects such as enabling the calculation of the magnitude of an overly large flow rate even when there is an overly large flow rate in excess of a 100% flow rate, thereby enabling the cumulative flow volume to be calculated accurately.

Figure 3:
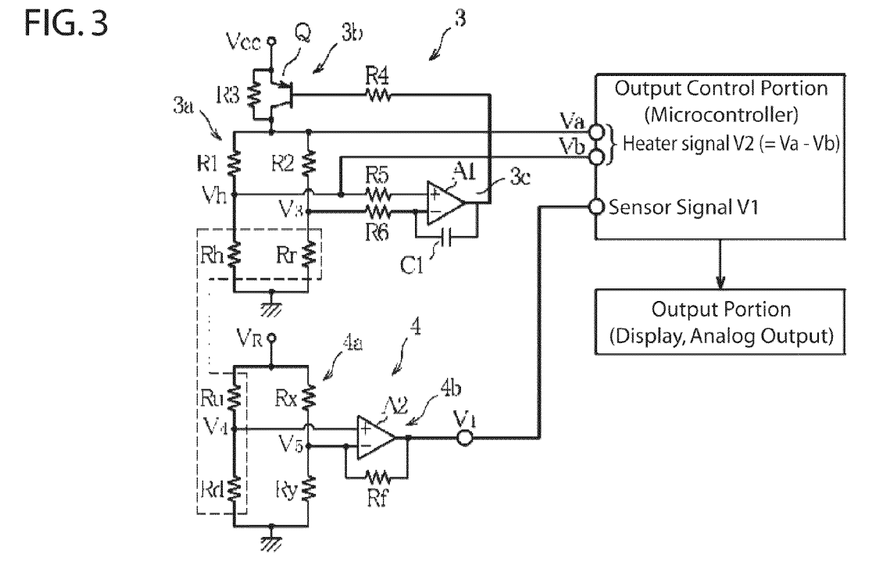
FIG. 3 is a diagram illustrating an example of a structure of a sensor driving circuit as set forth in an example of embodiment according to the present invention.

FIG. 3 illustrates a specific example of a structure for a thermal flow meter according to the present invention. Note that the sensor chip 1 used herein is not only provided with a pair of temperature-sensitive elements Ru and Rd has an element structure that is provided not only with a heater element Rh interposed therebetween, along the direction of opening of a cavity C (the direction of F of flow of the fluid) on a thin diaphragm that is formed bridging the cavity C, which is an indented shape in a semiconductor substrate (for example, a silicon substrate) B, as explained in reference to FIG. 8 and FIG. 9, above, but also a temperature detecting element Rr is provided in a position that is separate from the diaphragm D on the semiconductor substrate B. Note that the heater element Rh, the pair of temperature-sensitive elements Ru and Rd, and the temperature detecting element Rr are made of thin-film resistors of platinum (Pt), or the like, each deposited through vapor deposition on an insulating layer on the diaphragm D, for example.

The flow rate measuring device as set forth above is structured provided with a heater temperature controlling portion 3 for controlling the heat generation temperature of the heater element Rh, and a sensor voltage detecting portion 4 for detecting the flow rate of the fluid from the changes in the values of the resistances of the pair of temperature-sensitive elements Ru and Rd, as described above. Specifically, the sensor voltage detecting portion 4, as illustrated in FIG. 3, is structured provided with a pair of temperature-sensitive elements Ru and Rd that are provided in the direction of flow of the fluid with the heater element Rh interposed therebetween, a first bridge circuit 4a used for flow rate measurements, structured using a pair of constant resistors Rx and Ry, and a differential amplifier 4b for detecting the bridge output voltage (voltage differential across the bridge) in accordance with the change in the resistance values of the temperature-sensitive elements Ru and Rd in the first bridge circuit 4a.

Additionally, the heater temperature controlling portion 3 is structured provided with a second bridge circuit 3a used for temperature control, structured using the heater element Rh and the temperature detecting element Rr, along with a pair of constant resistors R1 and R2, a transistor 3b able to vary the driving voltage for the bridge circuit 3a by receiving a power supply voltage Vcc, and a differential amplifier 3c that provides feedback control of the operation of the transistor 3b in order to cause the bridge output voltage to go to zero after calculating the bridge output voltage (the voltage differential across the bridge) of the bridge circuit 3a. The heat generating temperature of the heater element Rh is controlled, by this feedback control of the transistor 3b depending on the output of the differential amplifier 3c, so that the heat-generating temperature of the heater element Rh will always be a particular temperature $\Delta T$ higher than the ambient temperature T that is detected by the temperature detecting element Rr.

Figure 4:
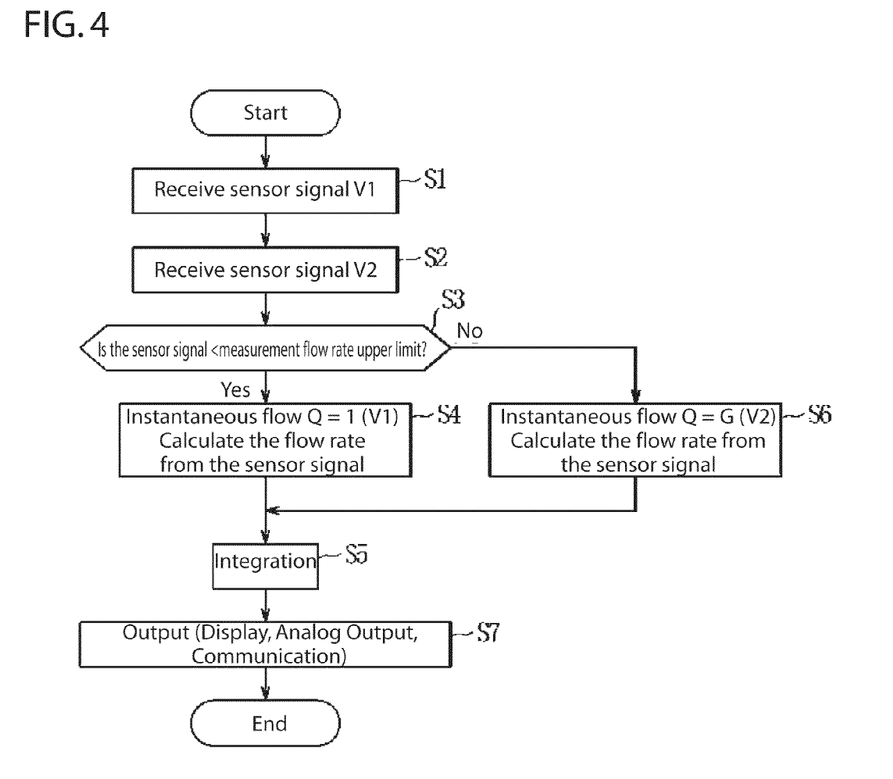
FIG. 4 is a diagram illustrating schematically the processing sequence in the output control portion

Note that in the present example of embodiment, the heater temperature controlling portion 3 outputs a driving voltage Va for the bridge circuit 3a, which is the output voltage of the transistor 3b, and outputs a voltage Vb that is applied to the heater element Rh. Furthermore, the output controlling portion 5 that is structured from, for example, a microprocessor calculates the difference between the driving voltages Va and Vb described above (that is, Va−Vb) as the heater driving energy (heater signal V2) corresponding to the amount of heat generated by the heater element Rh, described above. Furthermore, the output controlling portion 5, which is structured provided with the level evaluating portion 6, the heater voltage detecting portion 7 and the switch circuit 8, calculates the output in accordance with the flow rate Q of the fluid based on the sensor signal V1 and the heater signal V2 in accordance with a processing sequence as illustrated in FIG. 4, for example. That is, the flow rate calculating portion 5 first receives the sensor signal V1 and the heater signal V2 (Step S1 and S2) in accordance with a particular operating period, and then compares the value of the sensor signal V1 (the flow rate Qa) to the threshold value (the flow rate Qmax) described above (Step S3). If the value of the sensor signal V1 is no more than the threshold value, or in other words, if no more than a 100% flow rate, then the instantaneous flow at that time is calculated based on the sensor signal V1 (Step S4). The cumulative flow volume is calculated by summing the instantaneous flow rates.

In contrast, if the sensor signal V1 exceeds the threshold value (the 100% flow rate), then the instantaneous flow rate Qb is calculated based on the heater signal V2 (Step S6). The instantaneous flow rate Qb that is calculated based on the heater signal V2 is added to the cumulative flow volume at this point instead of adding the instantaneous flow rate Qa that is calculated based on the sensor signal V1 (Step S5). Consequently, it is still possible to perform the summation of the flow rate accurately even when there is an excessively large rate of flow. In this way, the cumulative flow volume value is outputted or displayed as the flow volume value measured by the thermal flow meter (Step S7).

Note that while in the example of embodiment set forth above the flow rate detection was performed with the temperature in the vicinity of the pair of temperature-sensitive elements Ru and Rd raised a particular temperature above the ambient temperature that is detected by the temperature detecting element Rr, it is also possible to perform the flow rate detection through controlling so that the average temperature Tave of the individual temperatures detected by the pair of temperature-sensitive elements Ru and Rd will be a particular temperature $\Delta T$ above the ambient temperature T that is detected by the temperature detecting element Rr.

Figure 5:
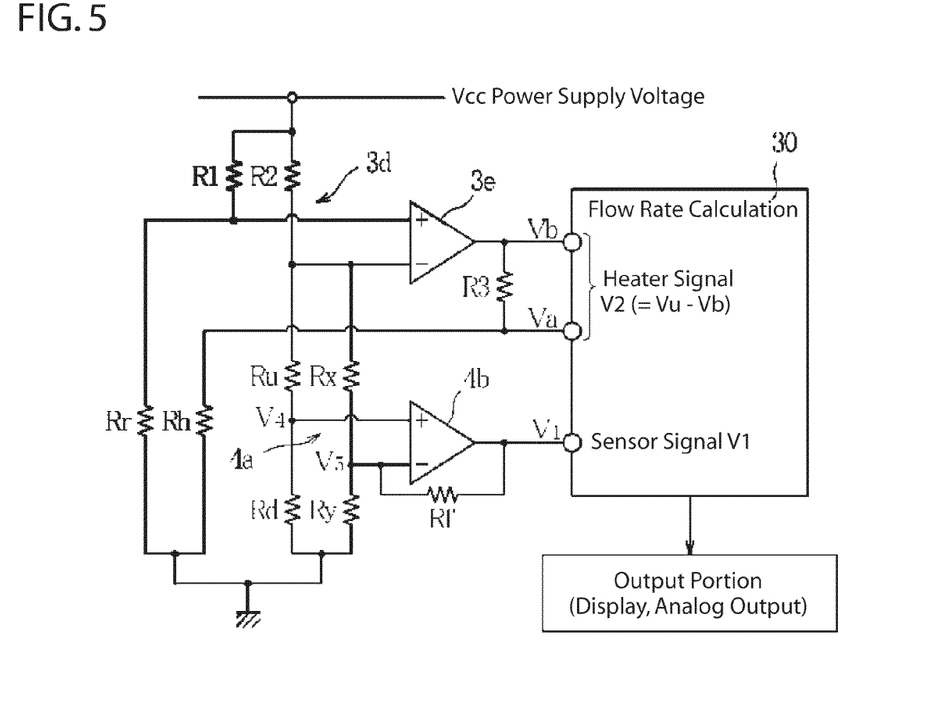
FIG. 5 is a diagram illustrating another example of a structure of a sensor driving circuit as set forth in an example of embodiment according to the present invention.

FIG. 5 illustrates an example of a structure for a driving circuit in the case of performing the flow rate detection under temperature control for the heater element Th in this way. In this case, the structure, as illustrated in FIG. 5, includes a first bridge circuit 4a, and a bridge circuit 3d instead of the second bridge circuit 3a, described above, between the bridge circuit 4a and the temperature detecting element Rr. The structure is such that a differential amplifier 3e for detecting the bridge output voltage of the bridge circuit 3d is used to control the driving of the heater element Rh, to thereby balance the bridge circuit 3d.

Even in the case of structuring the driving circuit for the flow rate sensor in this way, still the driving power for the heater element Rh can be detected as the voltage across the terminals of a constant resistor that is connected in series with the heater element Rh, in accordance with the flow rate Q, and this can be used as the heater signal V2. Consequently, just as in the example of embodiment described above, it even if the flow rate is in excess of 100%, it is possible to perform the flow rate detection using the heater signal V2, thereby enabling the flow rate detection to be performed across a broad flow rate range.

Figure 6:
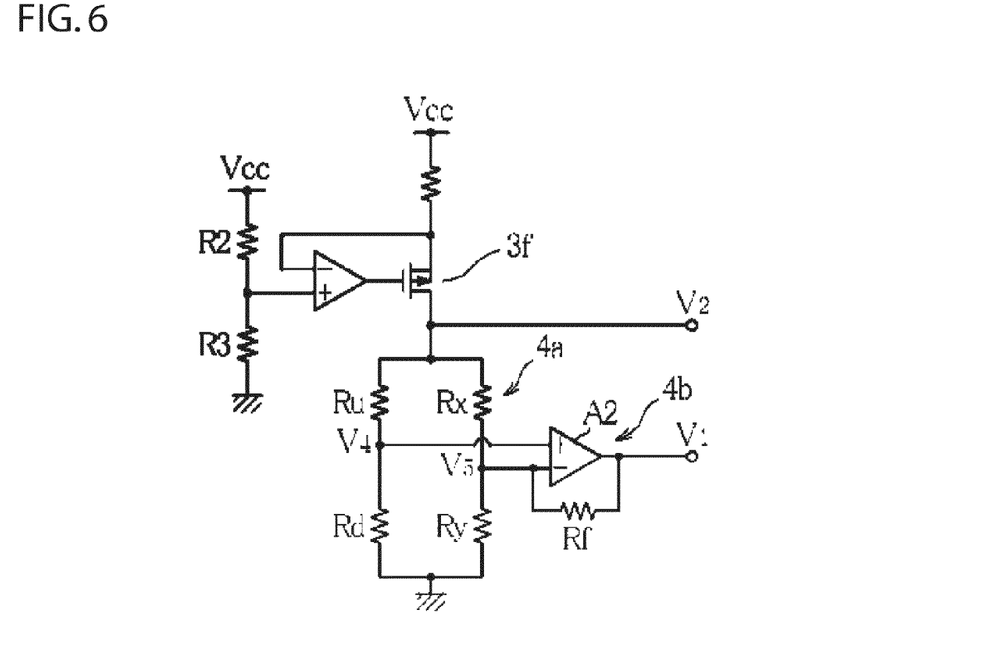
FIG. 6 is a diagram illustrating yet another example of a structure of a sensor driving circuit as set forth in an example of embodiment according to the present invention.

Note that while in the examples of embodiment described above the examples were of the use of a flow rate sensor equipped with a heater element Rh, instead it is possible to apply the present invention to a so-called self-heating-type thermal flow meter that uses, as the heat-generating elements, the temperature-sensitive elements Ru (Rd) that are used for detecting the temperature, with no heater element Rh provided. FIG. 6 illustrates an example of a structure in the case wherein the present invention is applied to a self-heating-type thermal flow meter of this type. In this case, the structure is such that there is a constant current drive of a first bridge circuit 4a that is structured including the pair of temperature-sensitive elements Ru and Rd through a constant current source that is structured provided with a transistor (FET) 3f, where the change in resistance in the temperature-sensitive elements Ru and Rd, which changes in accordance with the flow rate of the fluid is detected as the output of the bridge circuit 4a (the sensor signal V1), while the pair of temperature-sensitive elements Ru and Rd are still producing heat themselves. The structure is such that the driving voltage Va of the first bridge circuit 4a, which is driven by the constant current source at the same time, is detected as the heater voltage V2.

Given a driving circuit as structured in this way, there is the same effect as in the examples of embodiment set forth above because it is possible to calculate a flow rate Q that is in excess of the 100% flow rate from the driving voltage Va, because the driving voltage Va of the bridge circuit 4a increases in accordance with the increase of the flow rate, when the output (the sensor signal V1) is saturated by the amount of heat that is generated by the pair of temperature-sensitive elements Ru and Rd being carried away by a fluid with a large flow rate.

Note that the present invention is not limited to the forms of embodiment set forth above. For example, the flow rate value for the 100% flow rate may be established in accordance with the specification thereof. Furthermore, as illustrated in FIG. 7, because the heater signal V2 itself varies even when the sensor signal V1 is saturated in the negative range when the fluid is flowing in reverse, the structure may be one wherein the calculation is based on the heater signal V2 when the flow rate is large, even when detecting the flow rate when there is a reverse flow. However, the flow rate wherein the sensor signal V1 is saturated in the negative range is different from the flow rate of saturation in the positive range, so the flow rates that correspond to the sensor signals V2 will be different in the negative domain, and thus it is necessary to structure so as to switch the flow rate output of the output controlling means, and to perform the output of the flow rate, in accordance therewith.

Additionally, when the flow rate wherein the sensor signal V1 is saturated in the negative range when there is a reverse flow is structurally quite small in the sensor 1, as illustrated in FIG. 7, it is possible to structure so as to output a flow rate that is detected based on the heater signal V2 when a reverse flow is detected, in a state wherein the effect due to switching between the sensor signal V1 and the heater signal V2 will be small. Doing so eliminates the need for providing a circuit for switching when there is a reverse flow, making it possible to reduce the cost. The present invention may be embodied in a variety of other forms as well, without deviating from the spirit or intent thereof.

The invention claimed is:

1. A thermal flow meter comprising:
a sensor chip provided with a pair of temperature-sensitive elements;
a heater increasing an ambient temperature in a vicinity of the pair of temperature-sensing elements on the sensor chip by a particular temperature above a temperature of a fluid flowing along the sensor chip;
a first flow rate calculator calculating a flow rate of the fluid from a temperature difference detected by the pair of temperature-sensing elements;
a second flow rate calculator calculating a flow rate of the fluid from a driving energy of the heater that heats the ambient temperature by the particular temperature above the temperature of the fluid; and
an output controller outputting the flow rate calculated by the second flow rate calculator, instead of the flow rate calculated by the first flow rate calculator, when the flow rate calculated by the first flow rate calculator exceeds a flow rate threshold value that is set in advance, wherein the output controller is provided with a switching circuit that selectively outputs the flow rates in accordance with control of the output controller.

2. The thermal flow meter as set forth in claim 1, wherein:
the heater drives heat generation by a heater element that is lined up with the pair of temperature-sensitive elements and is formed between the temperature-sensitive elements, wherein the second flow rate calculator calculates the flow rate of the fluid from a driving power of the heater element.

3. The thermal flow meter as set forth in claim 1, wherein:
the heater drives heat generation by the pair of temperature-sensitive elements, where the second flow rate calculator calculates the flow rate of the fluid from a heat generating driving power for the pair of temperature-sensitive elements.

4. The thermal flow meter as set forth in claim 1, wherein:
the output controller outputs, as a reverse-flow flow rate of the fluid, the flow rate calculated by the second flow rate calculator, instead of the flow rate calculated by the first flow rate calculator, when the flow rate calculated by the first flow rate calculator is a negative value.

* * * * *